United States Patent
Habeck et al.

(10) Patent No.: US 8,763,872 B2
(45) Date of Patent: Jul. 1, 2014

(54) METHOD AND DEVICE FOR SEPARATING PLATES FROM MECHANICALLY BRITTLE AND NONMETAL MATERIALS

(75) Inventors: Andreas Habeck, Budenheim (DE); Volker Seibert, Hochheim (DE); Patrick Markschlaeger, Nieder-Olm (DE)

(73) Assignee: Schott AG, Mainz (DE)

( * ) Notice: Subject to any disclaimer, the term of this patent is extended or adjusted under 35 U.S.C. 154(b) by 1233 days.

(21) Appl. No.: 11/658,067

(22) PCT Filed: Jun. 15, 2005

(86) PCT No.: PCT/EP2005/006389
§ 371 (c)(1),
(2), (4) Date: Feb. 22, 2008

(87) PCT Pub. No.: WO2006/007907
PCT Pub. Date: Jan. 26, 2006

(65) Prior Publication Data
US 2009/0001118 A1    Jan. 1, 2009

(30) Foreign Application Priority Data
Jul. 21, 2004    (DE) .......................... 10 2004 035 342

(51) Int. Cl.
*B26F 3/00*    (2006.01)
(52) U.S. Cl.
USPC ............................................. 225/2; 225/96.5
(58) Field of Classification Search
USPC ..................... 225/2, 96.5; 83/452; 30/50, 526
See application file for complete search history.

(56) References Cited

U.S. PATENT DOCUMENTS

| | | | |
|---|---|---|---|
| 2,219,698 A * | 10/1940 | William | 225/2 |
| 3,116,862 A * | 1/1964 | De Gorter | 225/2 |
| 3,532,260 A | 10/1970 | Augustin et al. | |
| 4,347,958 A * | 9/1982 | Wood | 225/96.5 |
| 4,585,152 A * | 4/1986 | Sager | 225/1 |
| 5,154,334 A * | 10/1992 | Dekker et al. | 225/2 |
| 5,297,710 A * | 3/1994 | Juras | 225/2 |
| 5,551,618 A * | 9/1996 | Shinozaki et al. | 225/96 |
| 6,202,530 B1 * | 3/2001 | Cawley | 83/879 |

(Continued)

FOREIGN PATENT DOCUMENTS

| | | |
|---|---|---|
| DE | 35 37 434 | 4/1987 |
| DE | 42 14 159 | 11/1993 |

(Continued)

OTHER PUBLICATIONS

International Preliminary Report on Patentability dated Sep. 14, 2006 based on PCT/EP2005/006389.

(Continued)

Primary Examiner — Omar Flores Sanchez
(74) Attorney, Agent, or Firm — Ohlandt, Greeley, Ruggiero & Perle, LLP

(57) ABSTRACT

The invention concerns a method for separating plate-shaped workpieces of mechanically brittle and nonmetal materials along any contour desired, comprising the following steps:
  Scratching of separating lines along the contour up to a depth T by means of a cutting device in at least one side of the plate-shaped workpiece
is hereby characterized in that
  the plate-shaped workpiece is stimulated to bending vibrations at a vibration amplitude along the separating lines, so that
  the plate-shaped workpiece is completely separated along the separating line.

20 Claims, 2 Drawing Sheets

(56) References Cited

U.S. PATENT DOCUMENTS

Figure 2B:
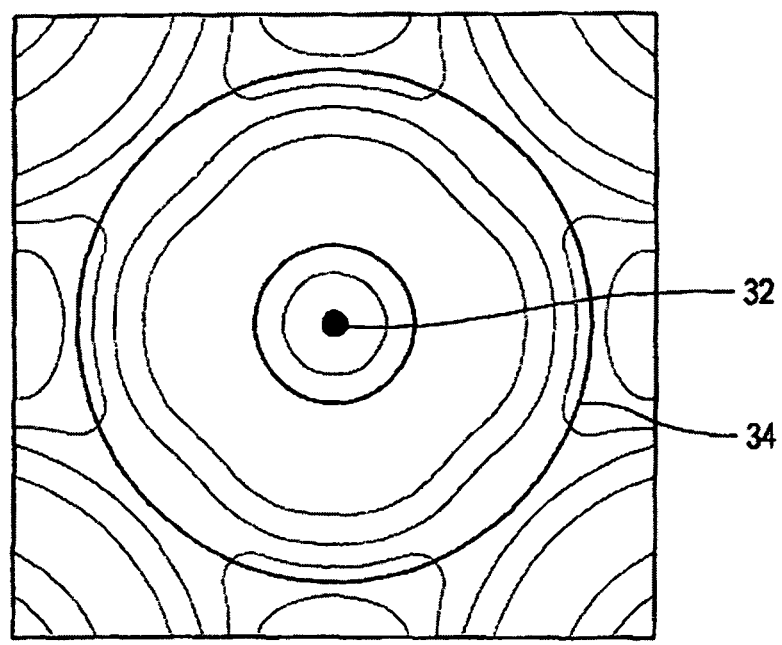

| | | |
|---|---|---|
| 6,478,206 B2 * | 11/2002 | Shimotoyodome et al. ...... 225/2 |
| 6,577,804 B2 * | 6/2003 | Murakami et al. ............ 385/147 |
| 7,699,200 B2 * | 4/2010 | Ueyama et al. .............. 225/96.5 |

FOREIGN PATENT DOCUMENTS

| | | | |
|---|---|---|---|
| DE | 43 00 730 | 3/1994 | |
| DE | 1 97 16 616 | 4/1997 | |
| DE | 1 97 15 537 | 10/1997 | |
| EP | 08 39 597 | 5/1998 | |
| EP | 08 72 303 | 10/1998 | |
| EP | 09 03 327 | 3/1999 | |
| EP | 14 22 201 | 5/2004 | |
| SU | 95 83 46 | 9/1982 | .............. C03B 33/04 |
| SU | 99 63 47 | 2/1983 | .............. C03B 33/02 |
| WO | WO 98/56722 | 12/1998 | |
| WO | WO 01/98368 | 12/2001 | |

OTHER PUBLICATIONS

International Search Report dated Aug. 12, 2005 based on PCT/EP2005/006389.

* cited by examiner

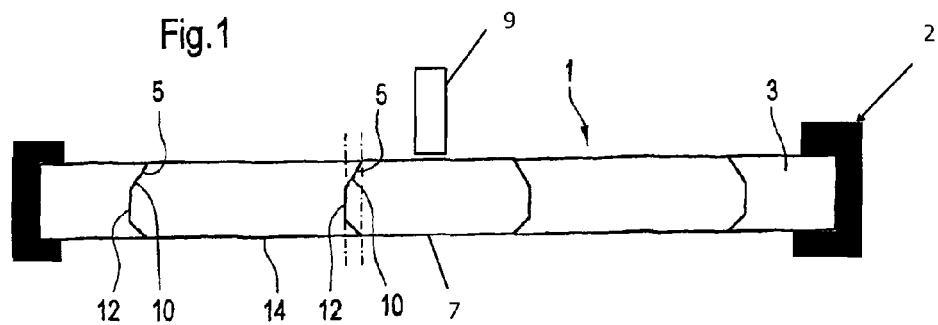
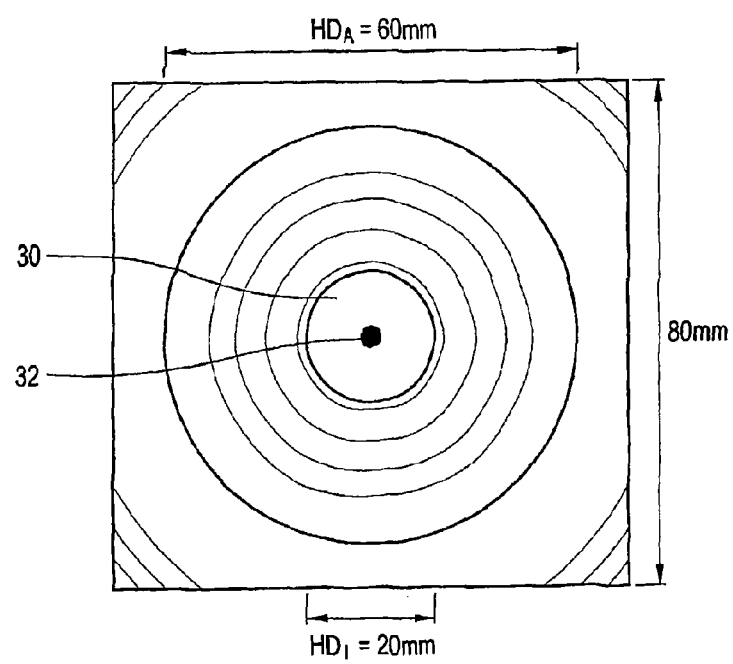

METHOD AND DEVICE FOR SEPARATING PLATES FROM MECHANICALLY BRITTLE AND NONMETAL MATERIALS

The invention concerns the precise cutting or separating of plate-shaped workpieces with few splinters or chips from mechanically brittle and nonmetal materials, such as panes of glass, for example.

The standard method for cutting or separating plate-shaped workpieces of nonmetal materials and brittle materials, in particular, is "scratching and breaking". In this method, a superficial scratch that acts as a predetermined breaking point is produced by a scratching tool in the surface of the workpiece and the workpiece is subsequently mechanically broken by bending. The disadvantages of this method lie particularly in the breaking operation, since the break can be controlled only slightly due to its high velocity, on the one hand, and, on the other hand, during bending, in general, essentially more elastic energy is stored by the workpiece than is necessary for producing the cut edges. This excess energy can lead to uncontrolled breaks, for example, with splintering or shell-like chipping of the cut edge. In addition, a zone of compressive stress, into which the break is forcibly run, arises during bending, on the side of the plate-shaped workpiece that is turned away from the superficial scratch. The break front regularly rotates out from the cut edge because of this. The consequences include an irregular cut edge with shell-like chipping and lance-like cracks as well as a high tendency toward splintering.

In the standard method in the glass industry, the superficial scratches serving as predetermined breaking points are produced with hard materials such as diamonds or hard metal or carbide wheels. Alternatively, predetermined breaking points can be produced in glass objects by means of laser beams according to DE 35 37 434 A1, DE 43 00 730 C1, DE 42 14 159 C1 und DE 1 971 661 6 C2.

Offenlegungsschrift [Unexamined] patent document DE 197 15 537 and Patent Application EP 08 72 303 A2 describe methods and devices for separating flat plate-like workpieces from mechanically brittle and brittle materials by means of a symmetric heat radiation spot that has an increased radiation intensity in its edge region and is moved along a predetermined separating line, and the separating line segment along which it has moved is subsequently cooled. These methods are suitable in principle for cutting brittle materials with little splintering, but they are expensive. A method has been made known from WO 98/56722 for breaking glass articles, in which several laser beams are used. European Patent Application EP 08 39 597 A1 describes a method and the design of devices suitable for this purpose for the cutting of strip-form workpieces from brittle material. A pulsed, punctiform heat source is directed onto the workpiece in this case, and a crack along a predeterminable cut edge that separates the workpiece is "pulled" by the thermomechanical stresses that arise thereby. Patent Application EP 09 03 327 A2 describes a method for cutting nonmetal materials, in which a plate-shaped workpiece is heated on the underside by a linear heating element and is simultaneously cooled on the top side by blowing with a coolant.

It is a disadvantage in the above-named methods that the cut must proceed from an initial break site that must be generated in a special process step. This initial break site is produced with hard materials such as, e.g., diamonds or hard metal or carbide wheels. The positioning of the initial break site must thus be very precise relative to the heating/cooling zones. Another disadvantage is that the thermomechanical stresses that are produced are small and thus there is the danger that the cut will be truncated. Another disadvantage is that plates are heated through their entire thickness for the generation of sufficient thermomechanical stresses and they must be cooled again. Due to the small heat conduction in nonmetal materials such as glass, for example, this requires a long time, i.e., the cutting speed is very slow.

The object of the invention is to create a method for separating plate-shaped workpieces from mechanically brittle and nonmetal materials, which permits a separation with little splintering and allows a precise control of the vertical cutting contour. In addition, the separating will be conducted by simple means and at a sufficient velocity.

According to the invention, this object is solved in that the plate-form workpiece which is to be separated and is provided with a continuous superficial scratch is stimulated to bending vibrations with a vibration amplitude along a separating line, so that the plate-form workpiece is completely separated along the separating line. The bending vibrations can be stimulated preferably by a device transmitting vibrations, so that the separating process is conducted by means of a cyclical introduction of the load. The device transmitting vibrations, which is placed, for example, on a scratched glass plate at a suitable position and is coupled to it, stimulates the plate to vibrate at its intrinsic frequency. With a suitable mounting of the plate and with suitable vibration frequencies, the amplitude maxima lie in the region of the superficial scratch track and lead to a cyclical tensile loading perpendicular to this track. In this way, the superficial scratch track is widened differentially, perpendicular to the glass surface, so that a catastrophic and abrupt breakthrough is replaced by a continuous propagation of the crack. Particularly preferred, the method according to the invention is used for sound-induced breaking in the production of glass substrates for storage media, so-called hard disks. It is possible with the method according to the invention to propel the superficial scratch in a hard disk (HD) blank through a planar glass plate in such a way that the hard disk can be detached from the glass blank without damage and without another processing step, such as, for example, a subsequent edge processing of the inner and the outer edges.

The invention will be described below on the basis of examples of embodiment. Herein is shown:

FIG. 1: Section through a glass substrate for electronic memory media, which was broken according to the prior art.

FIG. 2a: The vibration modes for separating out the inner diameter

FIG. 2b: The vibration modes for separating out the outer diameter

The invention will be described on the basis of a special application, i.e., the production of glass substrates for electronic storage media, but without being limited thereto.

Generally, the process consists of detaching a hard disk (HD) glass blank from a planar glass plate and is comprised of three process steps independent of one another:
1. Superficial scratching with a suitable cutting tool, such as a diamond, a cutting wheel or a laser
2. Breaking or propelling the initial superficial crack through the entire blank
3. Separating the HD blank from the glass plate under the effect of mechanical loads and thermal gradients acting centrally onto the glass plate.

In FIG. 1, an HD blank 1 is shown, which is detached from a glass plate 3 by means of conventional technology.

Based on the geometry of the planar glass plate 3 and the stress profile resulting therefrom during the superficial scratching, in the first process step, circular superficial scratches 5 are produced, which have as a consequence initial superficial cracks that typically do not run perpendicular to the glass surface 7. The initial superficial cracks 10 show offsets of 20 to 30 µm, which are oriented to the outer side of the plate. The surface and volume damage that arise in this process step represents a predetermined breaking point of the glass.

In the second process step, the predetermined breaking points produced in the first process step are loaded under tensile stress via a symmetrical introduction of force with a suitable support of the glass plate. The initial cracks 10 are thus controlled as much as possible when they are propagated through the glass plate. Typical is a break 12 running in the center of the plate, perpendicular to the surface, this break being angled out again about 20 to 30 µm, but this time inwardly, in the region of the head of the crack on the plate side 14 lying opposite the superficial scratch. Barrel-shaped geometries of the hard disk result from the standard breaking methods.

In the third step of the process, the HD blanks are detached from the glass plate by means of a bending process under the effect of a centrally acting mechanical load. In order to support the detaching process, the HD which has been broken in the second process step is cooled with suitable coolants, since a cylinder-shaped structure with the named geometric deviations basically cannot be detached from a glass plate without damage.

Glass is a mechanically brittle material and has a relatively low thermal expansion of typically 3.5-11 ppm/K. If commonly used geometries of 2.5" HD form the basis for the process, then with commonly used coolants (e.g., $N_2$), it is assumed that with complete cooling of the broken HD, maximum geometric tolerances of 50 to 60 µm can be equilibrated. The detaching step of the described process is thus necessarily combined with a mechanical contacting of the edges of the HD blank with the glass support. As a consequence of this contacting, breaks occur at the edges. The edge breaks require another processing step, such as, for example, a subsequent edge processing of the inner and the outer edges.

It is possible with the method according to the invention to avoid these disadvantages and to achieve a defined crack propagation without offset, perpendicular to the surface of the glass plate. A suitable cylindrical or slightly conical contour of the inner and outer edges of the HD results from the breaking process, which makes possible a damage-free separation of the HD from the glass substrate.

Standard breaking processes are based on exceeding the physical limit of strength of a material, characterized by the fracture toughness $K_{1C}$, which leads to an abrupt, catastrophic break along predetermined superficial fracture lines. The mathematical relationship of the values relevant to the break is given by the fracture criterion of the K concept. Here, σ indicates the mechanical stress, a the depth of the superficial fracture or crack and $C_0$ is a constant.

$$K_1 = C_0 \cdot \sigma \cdot \sqrt{a} \text{ for } K_1 \geq K_{1C} \text{ results in a break.}$$

Reaching $K_{1C}$, for example, by a bending process results in an abrupt release of the stored elastic energy, with the undesired concomitant phenomena of uncontrollable propagation of the crack and damage of the glass edges.

The inventors have now recognized that in order to widen a superficial crack through a brittle material such as glass, it is basically not necessary to exceed $K_{1C}$. Cracks also propagate slowly in the glass under the action of stresses. This is physically denoted stress crack corrosion. The propagation of the crack in the glass can be controlled in a defined manner, depending on the level of the mechanically introduced loads and the time duration of the load action.

According to the invention, the separation results by stimulating the plate-shaped workpiece to bending vibrations, with which a superficial crack introduced in the glass is driven through the glass in a defined manner.

The cyclical introduction of the load can be produced, for example, via a sound generator 9. The sound generator 9, which is placed on the scratched glass plate at a suitable position and is coupled to it, stimulates the glass plate to vibrate at its intrinsic frequency. With a suitable mounting of the glass plate and with suitable vibration frequencies, the amplitude maxima lie in the region of the superficial scratch tracks and lead to a cyclical tensile loading perpendicular to this track. Then the superficial scratch tracks are widened differentially, perpendicular to the glass surface, so that a continuous propagation of the crack is produced.

In FIGS. 2a and 2b are shown the vibration modes for separating out the inner diameter and the outer diameter of the entire hard disk from a glass plate. The following material data were the basis of the vibration analysis for a common commercial 2.5" hard disk:

E-Modulus: 72.9 GPa
Transverse contraction value: 0.21
Density: 2505 kg/m³
The geometrical data were as follows:
Glass thickness d: 0.7 mm
Outer edge of a square glass plate: 80 mm×80 mm
HD inner edge-Ø $HD_I$ 20 mm
HD outer edge Ø $HD_O$ 65 mm The glass plate from which the hard disk was to be broken out, was concentrically clamped using a suitable clamping device 2 shown in FIG. 1. The diameter of the bearing, on which the glass plate was clamped, for example, amounted to $D_{bearing}$=60 mm.

In FIG. 2a, the form of the intrinsic bending vibrations is shown for the case of a sinusoidal (harmonic) stimulation of 650 Hz in a plate-shaped workpiece. In the center (32) of the plate-shaped workpiece, the site of stimulation is depicted for a suitable device transmitting vibrations. Cyclical vibration amplitudes occur both on the inner as well as also on the outer separation lines of the plate-shaped workpiece, and these amplitudes thus also introduce cyclical tensile stresses into the regions to be separated and lead to a differential crack propagation in the region of the superficial scratch and to a separation of the scratched workpiece along the region of the superficial crack.

In FIG. 2b, as a second example, the form of the intrinsic bending vibrations is shown for the case of a sinusoidal (harmonic) stimulation of 1640 Hz. In this case also, both the inner and the outer separation lines are stimulated cyclically to bending vibrations.

It is possible with the method according to the invention to separate out, for example simultaneously, the inner and outer radii of a hard disk from a glass plate without damage to the edges by a suitable stimulation to intrinsic vibrations.

The required amplitudes for the separation according to the method of the invention are dependent on the constraints, the geometric data and on the material data of the material to be separated.

The bending stresses acting on the superficial crack are adjusted via the vibration amplitudes of the device transmitting vibrations in such a way that these stresses make possible a subcritical propagation of the crack with a cracking velocity of up to 1 mm/s, so that a separation of the material takes place essentially perpendicular to the surface of the workpiece.

The invention claimed is:

1. A method for cutting a plate-shaped workpiece of mechanically brittle and nonmetal materials along any contour desired, comprising the following steps:
   scratching a separating line along the contour up to a depth T by a cutting device in at least one side of the plate-shaped workpiece to define a blank,
   placing a sound generator at a central location of the blank,
   stimulating, via the sound generator, the plate-shaped workpiece to bending vibrations at a vibration amplitude along the separating line such that the plate-shaped workpiece is completely separated along the separating line, and
   adjusting the vibration amplitudes so that a subcritical propagation of the separating line propagates essentially perpendicular to the at least one side of the plate-shaped workpiece.

2. The method according to claim 1, wherein the bending vibrations in the plate-shaped workpiece are introduced by a stimulation of vibrations.

3. The method according to claim 1, further comprising generating an amplitude maximum in a region of the separating line due to the vibration amplitude.

4. The method according to claim 3, further comprising widening the separating line perpendicular to a surface of the plate-shaped workpiece due to a cyclical tensile stress in the region of the separating line, until the plate-shaped workpiece is separated along the separating line.

5. The method according to claim 1, further comprising concentrically clamping the plate-shaped workpiece.

6. The method according to claim 1, further comprising detaching a glass substrate for memory media, wherein the separating line is a circular separating line that corresponds to an outer diameter or an inner diameter.

7. The method according to claim 2, further comprising generating an amplitude maximum in a region of the separating line due to the vibration amplitude.

8. The method according to claim 2, further comprising concentrically clamping the plate-shaped workpiece.

9. The method according to claim 3, further comprising concentrically clamping the plate-shaped workpiece.

10. The method according claim 4, further comprising concentrically clamping the plate-shaped workpiece.

11. The method according to claim 2, further comprising detaching a glass substrate for memory media, wherein the separating line is a circular separating line that corresponds to an outer diameter or an inner diameter.

12. The method according to claim 3, further comprising detaching a glass substrate for memory media, wherein the separating line is a circular separating line that corresponds to an outer diameter or an inner diameter.

13. The method according to claim 4, further comprising detaching a glass substrate for memory media, wherein the separating line is a circular separating line that corresponds to an outer diameter or an inner diameter.

14. The method according to claim 5, further comprising detaching a glass substrate for memory media, wherein the separating line is a circular separating line that corresponds to an outer diameter or an inner diameter.

15. The method according to claim 1, wherein the separating line is a plurality of separating lines.

16. The method according to claim 6, wherein the glass substrate is a plurality of glass substrates.

17. A method for cutting a plate-shaped workpiece of mechanically brittle and nonmetal materials along any contour desired, comprising the following steps:
   providing an initial, continuous superficial scratch along the contour in at least one side of the plate-shaped workpiece, the contour defining a blank in the plate-shaped workpiece,
   propelling the initial, continuous superficial crack perpendicular to a surface of the plate-shaped workpiece through an entire thickness of the plate-shaped workpiece by applying a vibration amplitude along the initial, continuous superficial scratch, and
   adjusting the vibration amplitudes so that the initial, continuous superficial crack propagates in a direction that is perpendicular to the surface, wherein the propelling step comprises placing a sound generator at a central location of the blank.

18. The method according to claim 17, wherein the sound generator remains at the central location of the plate-shaped workpiece during the propelling step.

19. The method according to claim 1, wherein the sound generator remains at the central location of the plate-shaped workpiece during the stimulating step.

20. A method for cutting a plate-shaped workpiece of mechanically brittle and nonmetal materials along any contour desired, comprising the following steps:
   clamping the plate-shaped workpiece at an outer periphery;
   providing an initial, continuous superficial scratch along the contour in at least one side of the plate-shaped workpiece, the contour defining a blank in the plate-shaped workpiece,
   placing a sound generator at a central location of the blank, and
   activating the sound generator to propel the initial, continuous superficial crack perpendicular to a surface of the plate-shaped workpiece through an entire thickness of the plate-shaped workpiece, wherein the sound generator remains at the central location of the plate-shaped workpiece while the initial, continuous superficial crack is propelled through the entire thickness of the plate-shaped workpiece.

* * * * *